United States Patent [19]

Yamanaka et al.

[11] Patent Number: 4,977,413
[45] Date of Patent: Dec. 11, 1990

[54] INK REMAIN DETECTOR HAVING A FLEXIBLE MEMBER AND A LIQUID INJECTION RECORDING APPARATUS UTILIZING THE DETECTOR

[75] Inventors: Akihiro Yamanaka, Hiratsuka; Hiroshi Iida, Machida; Minoru Nozawa, Atsugi, all of Japan

[73] Assignee: Canon Kabushiki Kaisha, Tokyo, Japan

[21] Appl. No.: 423,746

[22] Filed: Oct. 19, 1989

Related U.S. Application Data

[63] Continuation of Ser. No. 179,867, Apr. 11, 1988, abandoned.

[30] Foreign Application Priority Data

Apr. 15, 1987 [JP] Japan .................................. 62-92823
Apr. 15, 1987 [JP] Japan .................................. 62-92824

[51] Int. Cl.⁵ .............................................. B41J 2/17
[52] U.S. Cl. .................................. 346/140 R; 73/301; 200/83 N; 340/618
[58] Field of Search ..................... 346/140; 200/83 N; 340/618, 619, 620; 73/301

[56] References Cited

U.S. PATENT DOCUMENTS

| | | | |
|---|---|---|---|
| 3,911,393 | 10/1975 | Biggs | 200/83 N X |
| 4,014,213 | 3/1977 | Parquet | 73/290 |
| 4,342,042 | 7/1982 | Cruz-Uribe | 346/140 |
| 4,432,005 | 2/1984 | Duffield | 346/140 |
| 4,604,633 | 8/1986 | Kimura | 346/140 |

FOREIGN PATENT DOCUMENTS

| | | |
|---|---|---|
| 1773167 | 3/1972 | Fed. Rep. of Germany . |
| 3131944 | 3/1982 | Fed. Rep. of Germany . |
| 3244935 | 6/1984 | Fed. Rep. of Germany . |
| 3344447 | 6/1984 | Fed. Rep. of Germany . |
| 3533412 | 12/1986 | Fed. Rep. of Germany . |

Primary Examiner—Joseph W. Hartary
Attorney, Agent, or Firm—Fitzpatrick, Cella, Harper & Scinto

[57] ABSTRACT

A liquid injection recording apparatus having a recording head for injecting ink toward a recording medium to thereby effect recording, an ink tank storing therein ink to be supplied to the recording head, and an ink remain detector provided within a supply path communicating the recording head with the ink tank are presented. The ink remain detector has an ink chamber having at least one wall surface thereof formed of a flexible film member, and at least two detector means responsive to the displacement of the film member.

21 Claims, 9 Drawing Sheets

INK REMAIN DETECTOR HAVING A FLEXIBLE MEMBER AND A LIQUID INJECTION RECORDING APPARATUS UTILIZING THE DETECTOR

This application is a continuation of application Ser. No. 179,867, filed Apr. 11, 1988, now abandoned.

BACKGROUND OF THE INVENTION

1. Field of the Invention

This invention relates to a remain detector operated by a variation in pressure and a liquid injection recording apparatus provided with the detector.

2. Related Background Art

The liquid injection recording apparatus is usually called an ink jet recording apparatus, and is designed such that ink in a plurality of ink discharge ports provided in a recording head is driven on the basis of recording information, whereby flying ink droplets going from the ink discharge ports toward a recording medium are formed to record images, characters, etc. on the recording medium.

In the recording apparatus of this type, an ink ribbon or the like is not used, but rather, liquid ink stored in an ink tank is supplied to a recording head through an ink supply path formed by a tube or the like and is caused to fly as minute liquid droplets to a recording medium by the discharging mechanism of the recording head and adhere to the recording medium to thereby accomplish recording.

Accordingly, unlike an ink ribbon type recording apparatus, to prevent unsatisfactory recording caused by the shortage of ink, a construction is generally adopted in which a device for detecting the amount of remaining ink in the ink tank is provided and when the amount of remaining ink has become insufficient, an alarm sound or the like is generated to thereby urge the operator to supply ink or interchange the cartridge type ink tank.

FIGS. 1A and 1B of the accompanying drawings show the construction of the essential portions of liquid injection recording apparatuses which are suitable for applying the present invention.

In FIG. 1A, a recording head 1 is for discharging ink droplets to a recording medium having its recording surface regulated by a platen 8 to thereby accomplish recording, and is carried on a carriage 2 movable along a pair of guide shafts G installed parallel to the platen 8.

A sub-ink tank 4 is also carried on the carriage 2, and the ink in this sub-ink tank is supplied to the recording head 1 through a supply tube 3.

An ink tank 7, as an ink supply source, is mounted on the body side of the recording apparatus, and this ink tank 7 and the sub-ink tank 4 are connected together by a flexible ink supply tube 5A. The ink tank 7 is constructed of a flat and flexible bag member formed of a sheet of plastic material or aluminum. An ink remain detector 6 is connected in the ink supply tube 5A.

The flexible ink supply tube 5A is bundled with a flexible suction tube 5B from half-way thereof, and constitutes a flexible communicating member 5 for absorbing the movement of the carriage 2.

The suction tube 5B connects a pump (suction means) 9 to the sub-ink tank so that the liquid level in the sub-ink tank 4 is maintained within a predetermined range. Also, this pump 9 is connected to capping means 10 for hermetically sealing the recording head 1, and constitutes an ink recovering device for sucking the ink from the fore end (the ink discharge ports) of the head 1 when recording is unsatisfactory or when the ink tank 7 is to be interchanged.

In the construction of FIG. 1A, the ink stored in the ink tank 7 is directed to the sub-ink tank 4 on the carriage 2 through the ink remain detector 6 and the ink supply tube 5A. Further, the ink is directed from the sub-ink tank 4 to the recording head 1 through the supply tube 3, and is discharged from the ink discharge ports of the recording head on the basis of recording information, whereby recording is effected on the recording medium on the platen 8.

FIG. 2 of the accompanying drawings shows a structure proposed as the ink remain detector 6.

In FIG. 2, a flexible film member 13 is held between a body 11 and the joined surface of a cover 12, and the space in the body 11 provides an ink chamber 26 isolated from the atmosphere. The body 11, the film member 13 and the cover 12 may be jointed together by a suitable method such as bonding, welding or screw-setting.

The body 11 is formed with an ink inflow port 24 and an ink outflow port 25 for connecting the ink supply tube 5A (FIGS. 1A and 1B), and the ink chamber 26 which, being a space partitioned by the film member 13, forms a part of an ink supply path.

The film member 13 is supported between a lower plate 14 and an upper plate 15.

The lower plate 14 is coupled to the lower end of a bolt 17 biased upwardly by a spring 16, and is normally held in its uppermost position as shown.

On the other hand, the upper plate 15 is slidably fitted to the bolt 17 and urged against a pair of electrodes 18 and 19 fixed to the back of the cover 12 with the lower plate 14 and the film member 13 interposed therebetween, by the spring force of the spring 16. The upper plate 15 is made of an electrically conductive material and may be urged against and separated from the pair of electrodes 18 and 19 to perform a switching operation as detector means.

The electrodes 18 and 19 are connected to leadout terminals 20 and 21, respectively, provided on the cover 12.

A nut 22 is threadably engaged with the upper threaded portion of the bolt 17 so as to be adjustable in its vertical position, and the spring (compression coil spring 16 is mounted below the nut 22 between a spring holder 23 and the surface of the cover 12.

Thus, by rotating the nut 22 and adjusting the position of the nut 22 on the bolt 17 by adjusting means, which is screw means, the magnitude of the upward force of the spring 16 acting on the film member 13 can be adjusted, whereby the operation setting of the ink remain detector 6 can be adjusted.

In such a construction, when the amount of remaining ink in the ink tank 7 in the form of a hermetically sealed bag having at least a portion thereof formed of a flexible sheet decreases, the negative, pressure in the ink supply path becomes strong. In response thereto, the film member 13 is downwardly attracted against the spring force of the spring 16, and when a predetermined negative pressure value adjusted by the nut 22 is reached, the film member 13 lowers and the electrically conductive plate 15 separates from the pair of electrodes 18 and 19.

Thereby, the lead-out terminals 20 and 21 are switched off (rendered non-conductive) and by the then variation in resistance value, it is detected that the amount of remaining ink has become less than a set value.

However, the conventional ink remain detector 6 of FIG. 2 sometimes gives rise to the following problems.

If consumption of ink is continued by the recording operation or by using the pump even after it is detected that the amount of remaining ink has become less than the set value, excessively great deformation occurs to the flexible film member 13 due to the excessive negative pressure produced in the ink supply path. This has led to the possibility that the operation setting pressure is varied and further, the film member 13 is damaged.

Also, continued recording with the amount of remaining ink being null would adversely affect the recording head 1.

These inconveniences are liable to occur when the operator of the recording apparatus is absent in spite of the ink remain detector having operated during recording.

As means for preventing such inconveniences, it is conceivable to stop the operation of the recording apparatus when an output, detecting that the amount of remaining ink has become small, is produced from the ink remain detector.

However, this method suffers from the great possibility that the, record, becomes wasteful in the course of recording. Also it has not always been a suitable method to carry out if the recording time and the amount of consumed ink are taken into account, particularly when hard copies are being output in a color liquid injection recording apparatus.

Also, in FIG. 1B, there is shown another form of the liquid injection recording apparatus provided with the ink remain detector described with reference to FIG. 1A. The difference between the apparatus of FIG. 1A and the apparatus of FIG. 1B is that in FIG. 1A, the ink remain detector 6 is connected to the ink supply tube 5A, whereas in FIG. 1B, the ink supply tube 5A is communicated with the ink tank 7 and the ink remain detector 6 is communicated with the ink tank 7 discretely therefrom. Accordingly, the apparatus shown in FIG. 1B need not be described in greater detail. Of course, in the case of FIG. 1B, one of the outlets of the ink remain detector 6 is closed so that no ink may leak.

In the case of FIG. 1B, any fluctuation of the pressure of the ink remain detector 6 is not transmitted to the ink in the ink supply tube 5A. This leads to a good result with respect to stable recording and stable detection of the amount of remaining ink. However, even in the case of the form shown in FIG. 1B, the above-noted problems have not been solved.

SUMMARY OF THE INVENTION

It is an object of the present invention to solve the above-noted problems peculiar to the prior art and to provide a liquid injection recording apparatus provided with an ink remain detector which is simple in structure and capable of accomplishing highly reliable and moreover, effective and accurate detection of the amount of remaining ink.

It is another object of the present invention to provide a liquid injection recording apparatus having a recording head for injecting ink toward a recording medium to thereby effect recording, an ink tank storing therein the ink to be supplied to said recording head, and an ink remain detector provided half-way in a supply path communicating said recording head with said ink tank, characterized in that said ink remain detector has an ink chamber having at least one wall surface thereof formed of a flexible film member, and at least two detector means responsive to the displacement of said film member.

It is still another object of the present invention to provide an ink remain detector provided with an inflow port into which ink flows, an outflow port from which ink flows out, an ink chamber communicating with said inflow port and said outflow port, a flexible film member constituting at least a portion of a wall forming said ink chamber, and a plurality of detector means each having an electrically conductive member provided on said film member and an electrode provided correspondingly to said electrically conductive member and fixed to the body of said detector.

DESCRIPTION OF THE PREFERRED EMBODIMENTS

The invention will hereinafter be specifically described with reference to FIGS. 3 to 9.

(Embodiment 1)

Figure 3A:
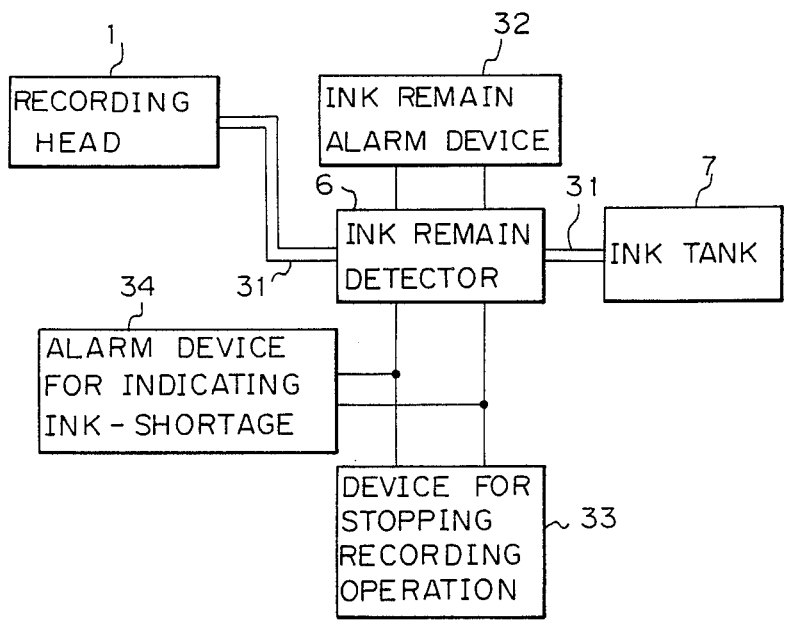
FIG. 3A is a block diagram showing the construction of the essential portions of the liquid injection recording apparatus of the present invention.

FIG. 3A is a block diagram of a control system in an embodiment of a liquid injection recording apparatus according to the present invention.

In FIG. 3A, an ink remain detector 6 is mechanically connected in an ink supply path 31 which connects an ink tank 7 to a recording head 1. Further, the ink remain detector 6 has electrically connected thereto, an ink remain alarm device 32 for informing that little ink remains, a device 33 for stopping the recording operation and/or an alarm device 34 for indicating ink-shortage.

The ink remain alarm device 32 is a device for informing the operator in advance that the amount of remaining ink has become small and if recording is continued any further, normal printing will become impossible at a predetermined amount of recording.

Also, the alarm device 34 for indicating ink-shortage is a device for informing the operator that the amount of remaining ink is less than a predetermined amount and the negative pressure in the supply path has reduced to such a degree that normal printing is impossible and further that the recording operation has been stopped.

Thus, the ink remain detector 6 is provided with detector means for the two different alarm devices 32 and 34 operated at negative pressure and informing the operator that the amount of remaining ink has become small.

That is, in the present embodiment, the ink remain detector 6 is provided with detector means for the two different alarm devices 32 and 34 operated at negative pressure and informing the operator that the amount of remaining ink has become less than a set amount and that the amount of remaining ink has become so small that the negative pressure in the supply path becomes excessively great (abnormal) and the quality of print becomes inferior. Alternatively, the ink remain detector may be constructed of the two alarm devices, i.e., the ink remain alarm device 32 and the alarm device 34 for indicating ink-shortage, or an alarm device having those functions in one.

Figure 4:
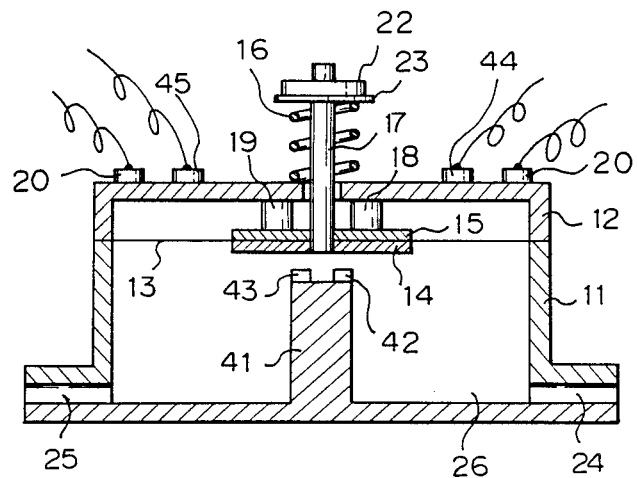
FIG. 4 is a longitudinal cross-sectional view of an ink remain detector according to an embodiment of the present invention.

FIG. 4 shows an embodiment of the ink remain detector provided with such two detector means.

Figure 2:
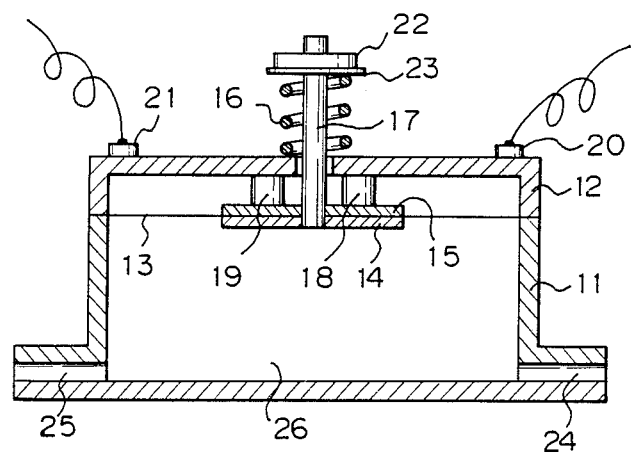
FIG. 2 is a longitudinal cross-sectional view of a conventional ink remain detector.

The ink remain detector 6 of FIG. 4 differs from the conventional ink remain detector 6 of FIG. 2 in that stopper means 41 having a pair of electrodes 42 and 43 in the air tight chamber of a body 11 is added, that a lower plate 14, like an upper plate 15, is formed of an electrically conductive material and that leadout terminals 44 and 45 connected to the pair of electrodes 42 and 43, respectively, on the stopper means 41 are added onto a cover 12, and is substantially identical in the other points to the conventional structure of FIG. 2. In FIG. 4, portions corresponding to those in FIG. 2 are given similar reference numerals and need not be described. In the present embodiment, as previously described, there are provided two detector means, i.e., first detector means comprised of electrodes 18 and 19 and the upper plate 15, and second detector means comprised of electrodes 42 and 43 and the lower plate 14.

Description will now be made of a preferred example in which an ink remain alarm and ink-shortage information and/or a detection output used to stop the recording operation are obtained by the use of the two detector means as shown in the present embodiment to thereby actually control the apparatus.

The stopper means 41 is for preventing excessively great downward displacement of a film member 13 by negative pressure, and in the shown example, it is formed integrally with the body 11, and the pair of electrodes 42 and 43 are provided on the bearing surface thereof, i.e., the upper surface thereof against which the lower plate 14 bears. In the present example, the stopper member is formed in the ink chamber.

In the construction of FIG. 4, when the amount of remaining ink in the ink tank 7 (FIG. 1A) becomes small, the upper plate 15 of electrically conductive material is separated from the electrodes 18 and 19 by the negative pressure produced in the ink supply path (the ink supply tube 5A, etc.), as in the conventional structure of FIG. 2), and the resistance between terminals 20 and 21 is varied.

These terminals 20 and 21 are connected to the ink remain alarm device 32, and the negative pressure value for which the resistance between these terminals is varied, i.e., the first set negative pressure value, is adjusted by a nut 22 so as to coincide with the intention of the ink remain alarm device.

If consumption of ink is further continued after the ink remain alarm device 32 is operated, the amount of displacement of the film member 13 increases with an increase in the negative pressure in the ink supply path and the electrically conductive lower plate 14 comes into contact with the electrodes 42 and 43 on the stopper means 41. Thereby, the resistance between another set of terminals 44 and 45 on the cover 12 is varied.

These terminals 44 and 45 are connected to the alarm device 34 for indicating ink-shortage and the device 33 for stopping the recording operation, and the negative pressure value for which the resistance between these terminals 44 is varied, i.e., the second set negative pressure value, is adjusted by adjusting means so as to coincide with the intention of the alarm device 34 for indicating ink-shortage, that is, so that the force of a resilient member such as spring means which biases a flexible film in a direction to increase the volume of the ink chamber (the flexible film is in a substantially undeformed state) is adjusted.

Figure 3B:
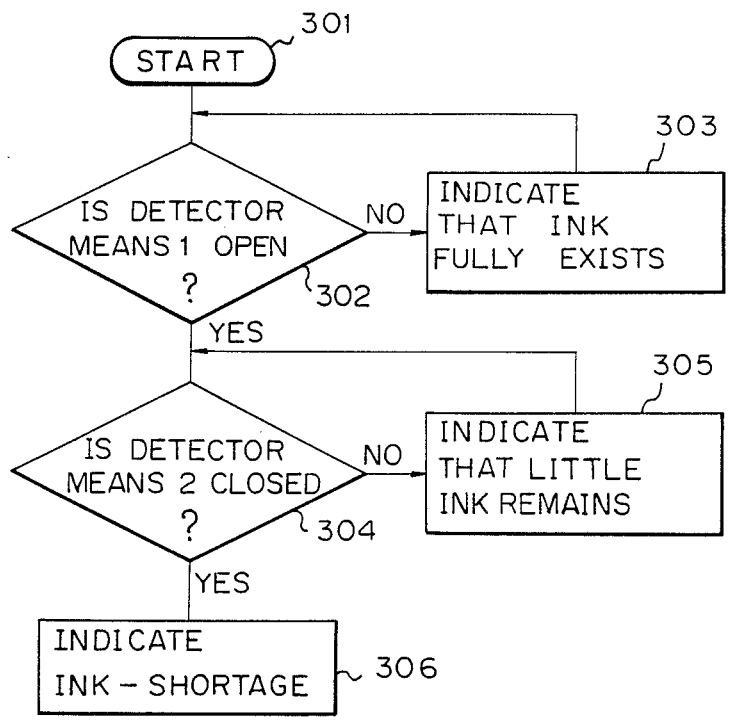
FIG. 3B is a flow chart showing the steps of the operation of the liquid injection recording apparatus shown in FIG. 3A.

The process explained above will be further described briefly with reference to the flow chart of FIG. 3B.

When the main switch of the apparatus is closed (step 301), whether the detector means 1 is open is judged (step 302). If the amount of remaining ink is sufficient, the detector means 1 is closed and therefore, in such case, if there is provided informing means for indicating the presence of ink, this means indicates that ink fully exists (step 303). When ink is used and consumed, the detector means 1 opens its contact, because the upper plate moves in conformity with the movement of the flexible film member. Thereupon, the judging function judges whether the detector means 2 is closed (step 304). If at this time, the detector means 2 is open, that is, both the detector means 1 and the detector means 2 are open, it is possible to continue recording, but it is indicated that ink remains, in little order to indicate that the amount of remaining ink has become small. If consumption of ink is further continued, the flexible film member is more deformed and the lower plate moves, whereby the contact of the detector means 2 is closed. When it is detected that the contact of the detector means 2 has been closed, it means that there is not left sufficient ink to continue recording and therefore, in accordance with this judgement, ink-shortage is indicated (step 306). Where the apparatus is provided with the automatic stopping function, the recording operation of the apparatus may also be stopped simultaneously therewith by the utilization of the result of this detection.

By providing a plurality of detector means (in this case, two detector means) in this manner, it is possible to easily indicate that ink fully exists, that little ink remains, and as the ink-shortage it is also possible to automatically stop the recording operation of the apparatus on the basis of the result of the detection by these detector means.

Figure 1A:
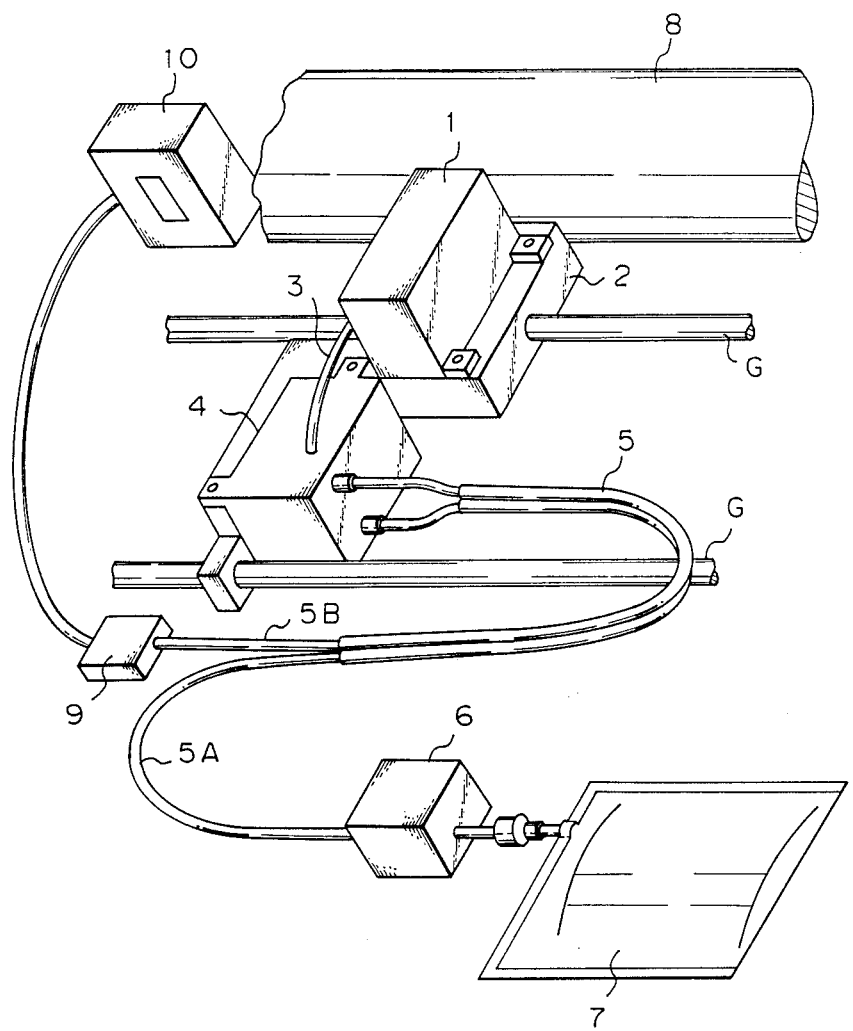
FIGS. 1A and 1B are perspective views showing the essential portions of liquid injection recording apparatuses which are suitable for applying the present invention.

If the liquid injection recording apparatus as shown in FIg. 1A is constructed by use of the ink remain detector 6 of FIG. 4 as described above, there are obtained the following operational effects.

The operator of the recording apparatus is informed in advance that the amount of remaining ink has become small, and then is informed that the amount of remaining ink for which normal printing cannot be accomplished has been reached and therefore, effective and highly reliable detection of the amount of remaining ink has become possible.

Also, the recording operation is stopped when normal printing has become impossible. Therefore it has also become possible to eliminate bad influence upon the recording head 1 and the ink remain detector 6.

Further, the ink remain detector 6 conforming to the purpose of the liquid injection recording apparatus is provided by a simple construction in which the pair of electrodes 42 and 43 are provided on the stopper means 41. Therefore, it has become possible to provide a liquid injection recording apparatus of high reliability easily without making the apparatus bulky and costly.

Also, such information can be accomplished accurately by light-emitting means such as LED or an electric bulb, sound generating means such as a chime, sound or piezo-electric buzzer, or display means such as a liquid crystal or CRT, or a combination of these means.

(Embodiment 2)

Figure 5:
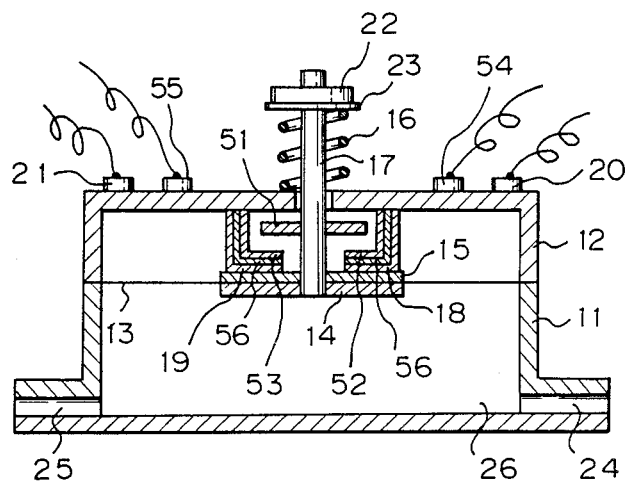
FIG. 5 is a longitudinal cross-sectional view of an ink remain detector according to another embodiment of the present invention.

FIG. 5 shows another embodiment of the ink remain detector according to the present invention.

The ink remain detector 6 of FIG. 5 differs from the conventional structure of FIG. 2 in that a stopper 51 of electrically conductive material is added to the intermediate portion of the bolt 17 and a second pair of electrodes 52 and 53, in addition to a first pair of electrodes 18 and 19, are added between the upper plate 15 of electrically conductive material and the stopper 51 and that lead-out terminals 54 and 55 connected to the second pair of electrodes 52 and 53, respectively, are added onto the cover 12, and is substantially identical in the other points to the conventional structure of FIG. 2. In FIG. 5, portions corresponding to those in FIG. 2 are given similar reference numerals and need not be described.

The stopper 51 and the second pair of electrodes 52 and 53 are provided on the upper side of the film member 13 in the cover 12, i.e., outside the ink supply path, and the first pair of electrodes 18 and 19 and the second pair of electrodes 52 and 53 are electrically insulated from each other by insulating materials 56.

In the construction of FIG. 5, as the negative pressure in the ink supply path increases, the electrically conductive upper plate 15 of the detector means 1 is first separated from the first pair of electrodes 18 and 19 and detects that the amount of remaining ink has become small.

When the negative pressure increases further, the electrically conductive stopper 51 of the detector means 2 comes into contact with the second pair of electrodes 52 and 53 and it is detected that normal printing has become impossible.

Thus, an operation similar to that of the embodiment of FIG. 4 is also obtained by the ink remain detector of FIG. 5, and operational effects similar to those of the embodiment of FIG. 4 are obtained.

Since in the structure of FIG. 5, the electrodes 52 and 53 of FIG. 5 are provided outside the ink supply path, no consideration need be paid to the contact with the ink.

In the above-described embodiments of FIGS. 4 and 5, the detection and information of the amount of remaining ink has been effected by a variation in the resistance between the electrodes, but alternatively, this may be effected by the use of a photoelectric type detecting device comprising light-emitting means and light-receiving means.

For example, in the ink remain detector of FIG. 4, light-emitting means and light-receiving means may be disposed at the positions of the electrodes 18 and 19 and a hole which provides an optical path may be formed in the bolt 17 as a moving member, whereby detection of the amount of remaining ink becomes possible.

Figure 6A:
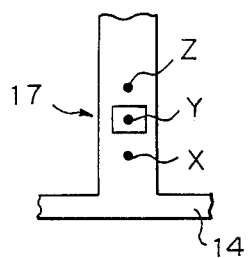
FIGS. 6A, 6B and 6C are schematic views illustrating the cross-sectional shapes of an optical path hole in a case where the amount of remaining ink is photoelectrically detected.
Figure 6B:
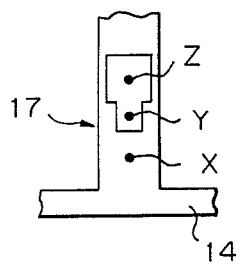
Figure 6C:
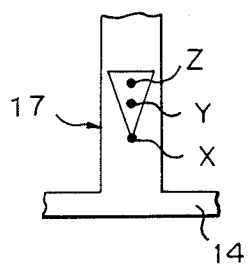

FIGS. 6A, 6B and 6C illustrate the cross-sectional shapes of optical path holes formed in the bolt 17.

The bolt 17 is lowered by the displacement of the film member 13 resulting from an increase in the negative pressure in the ink supply path.

In FIG. 6A, 6B and 6C, point X indicates the central position of the optical path when the amount of remaining ink is sufficient (the detecting position 1), point Y indicates the central position of the optical path when the amount of remaining ink is small (the detecting position 2), and point Z indicates the central position of the optical path when normal printing is impossible (the detecting position 3). That is, the detecting position 1 corresponds to a state in which the aforementioned detector means 1 and 2 are closed and opened, respectively, the detecting position 2 corresponds to a state in which both of the detector means 1 and 2 are opened, and the detecting position 3 corresponds to a state in which the detector means 1 and 2 are opened and closed, respectively.

Also, in the case of the present embodiment, the plurality of detector means may be considered to correspond to the cross-sectional shape of the optical path hole formed in the bolt 17 which is a moving member.

FIG. 6A shows the structure for producing a detection signal at the position of point Y, that is, when the amount of remaining ink has become small. The optical path hole may be formed not at the shown position of point Y, but at the position of point X or point Z.

FIGS. 6B and 6C show the structure in which the quantity of light transmitted from the light-emitting means to the light-receiving means, i.e., the magnitude of the output of the light-receiving means, is varied at the positions of points X, Y and Z to thereby obtain the same effect as that of the structure of the aforedescribed embodiment of FIG. 4 or 5.

For example, the output of the light-receiving means may be connected to a comparing circuit, an encoder or the like so that output is made to the ink remain alarm device 32 (FIG. 3) and the alarm device 34 for indicating ink-shortage (FIG. 3) or the device 33 for stopping the recording operation when outputs corresponding to point Y and point Z are produced, whereby the same effect can be obtained.

Also, when there are signals corresponding to points Y and Z, the operator of the recording apparatus can be informed of a continuous variation in the amount of remaining ink (a variation in the output of the light-receiving means).

When information is to be effected only when outputs corresponding to points Y and Z are produced, the stepped hole shape as shown in FIG. 6B is preferable, and when continuous information is to be effected, the stepless hole shape as shown in FIG. 6C is suitable.

Besides the above-described various embodiments, adoption may be made of such structure in which, for example, in the structure of FIG. 4, the electrodes 42 and 43 on the stopper means 41 are replaced by light-emitting means and light-receiving means and the lower plate 14, when lowered, interrupts the optical path therebetween, and further, the various detector means of the above-described embodiments may be suitably combined to constituted an ink remain detector.

According to each of the above-described embodiments, the ink remain detector 6 is provided with first detector means for detecting that the amount of ink in the ink tank 7 is small and second detector means for detecting the abnormally great negative pressure in the ink supply path. Therefore, the operator of the recording apparatus can be informed of the time for interchanging the ink tank 7. Also, by endowing the second detector means with the stopper function of controlling the amount of displacement of the film member, it has become possible to prevent the film member 13 from being damaged.

Also, the amount of displacement of the film member 13 is controlled by the stopper function even when excessively great negative pressure is produced as during the ink recovering operation and therefore, the restoration of the film member 13 to its initial state after the elimination of the negative pressure has been greatly improved.

Further, by simply adding electrodes or light-emitting means and light-receiving means to the conventional ink remain detector, there is provided an ink remain detector conforming to the purpose of a liquid injection recording apparatus and therefore, bulkiness and increased cost of the recording apparatus can be avoided.

Also, of course, the shape, etc. of the detector means are not limited to those utilizing electrical intermittence or those using light-emitting means and light-receiving means, or restricted to the electrode shape and hole shape shown in the above-described embodiments, but may be the most effective electrode shape and hole shape in conformity with the device used, without departing from the scope of the present invention.

(Embodiment 3)

Figure 7:
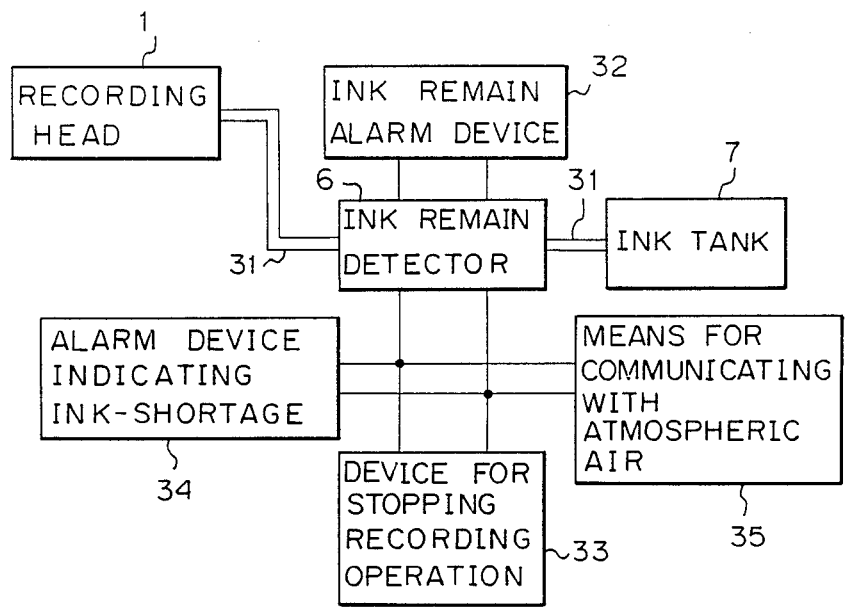
FIG. 7 is a block diagram of a control system in a second embodiment of the present invention.

FIG. 7 is a block diagram of a control system in a third embodiment of the liquid injection recording apparatus according to the present invention.

The control system of FIG. 7 is of a construction in which means 35 for communicating with the atmospheric air electrically connected to the ink remain detector 6 is added to the control system of FIG. 3A, and it is substantially identical in the other points to the control system of FIG. 3A. In FIG. 7, portions corresponding to those in FIG. 3A are given similar reference numerals and need not be described.

The means 35 for communicating with atmospheric air is means for rendering the interior of the ink remain detector 6, i.e., the hermetically sealed chamber in the body 11 partitioned by film member 13, into atmospheric pressure, and is designed to operate when the ink remain detector 6 detects the negative pressure for which normal printing is impossible, i.e., the abnormal negative pressure in the ink supply path.

Figure 1B:
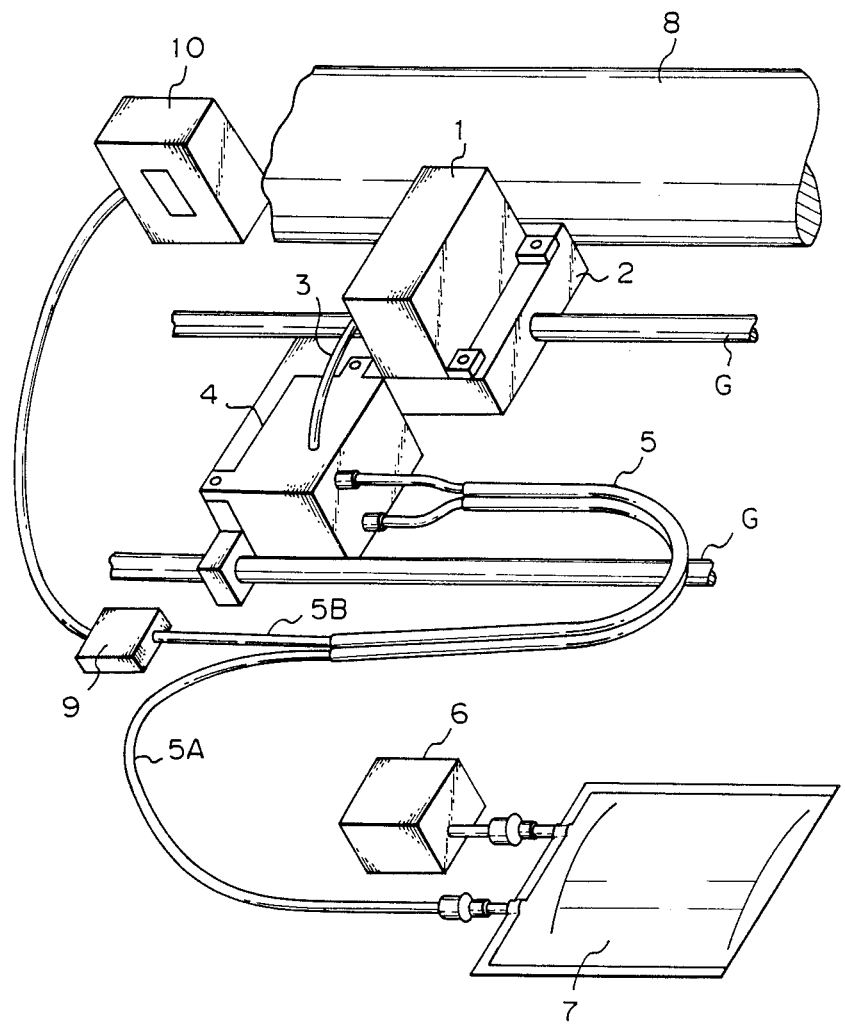
Figure 8:
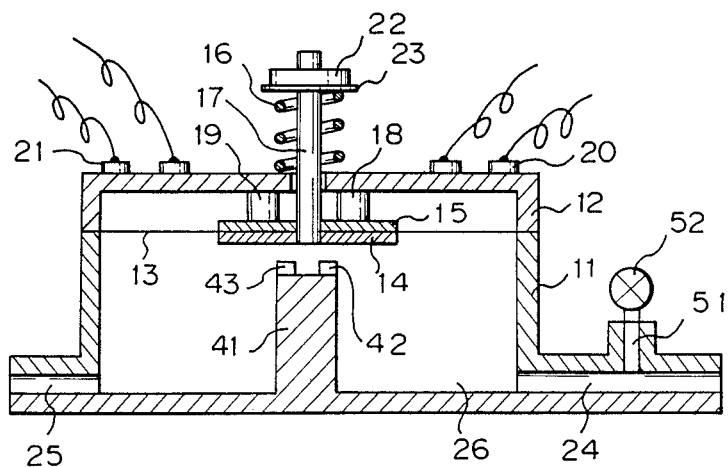
FIG. 8 is a longitudinal cross-sectional view of the ink remain detector in FIG. 7.

FIG. 8 shows the structure of the ink remain detector 6 used in the liquid injection recording apparatus of FIGS. 1A and 1B.

The ink remain detector of FIG. 8 differs from the structure of the FIG. 4 embodiment in that there is added the means 35 for communicating the hermetically sealed chamber in the body 11 partitioned by the film member 13 with atmospheric air, i.e., the means 35 for communicating with atmospheric air comprising a port 1 for communicating with atmospheric air and a member 2 for controlling the communication with atmospheric air such as an opening-closing valve.

Accordingly, the ink remain detector of FIG. 8 detects the negative pressure when the amount of remaining ink is small and the negative pressure for which normal printing is impossible (abnormal negative pressure) by an operation similar to that described in connection with FIG. 4, as the amount of remaining ink decreases, and in addition, operates (opens) the member 52 for controlling the communication with atmospheric air when the negative pressure for which normal printing is impossible has been reached, to thereby render the interior of the ink remain detector 6 into atmospheric pressure.

Now, again in the ink remain detector of FIG. 4, the flexible film member 13 is in its deformed state when the ink remain detector means operates, and taking the influence upon the film member into account, it is desirable that the interior of the ink remain detector be restored to atmospheric pressure as early as possible.

So, in the embodiment of FIGS. 3A and 4, the negative pressure for which normal printing is impossible is detected, whereafter atmospheric pressure is not reached until a predetermined countermeasure such as the interchange of the ink tank 7 is executed, whereas in the present embodiment (FIGS. 7 and 8), atmospheric pressure is reached at a point of time whereat normal printing has become impossible. Therefore, there is no necessity of fearing the above-described influence upon the film member even when the interchange of the ink tank 7 is not effected for a long period of time.

That is, according to the present embodiment, there is obtained an effect similar to that of the embodiment of FIGS. 3A and 4 and in addition by restoring the interior of the ink remain detector to atmospheric pressure immediately after the detecting operation, the durability and reliability of the film member 13 and other negative-pressure-responsive members can be more improved.

(Embodiment 4)

In the liquid injection recording apparatus shown in FIGS. 3A and 4, the stoppage of the recording operation and the operation of communicating with atmospheric air are effected simultaneously with the detection of negative pressure. Therefore, there is the possibility that the entire recording apparatus operates by mistake due to momentary malfunctioning of the ink remain detector 6.

To prevent such inconvenience, design may be made such that the aforementioned stoppage of the recording operation and the operation of communicating with atmospheric air are executed only when the ink remain detector 6 has continued the detecting operation for more than a predetermined time.

Figure 9:
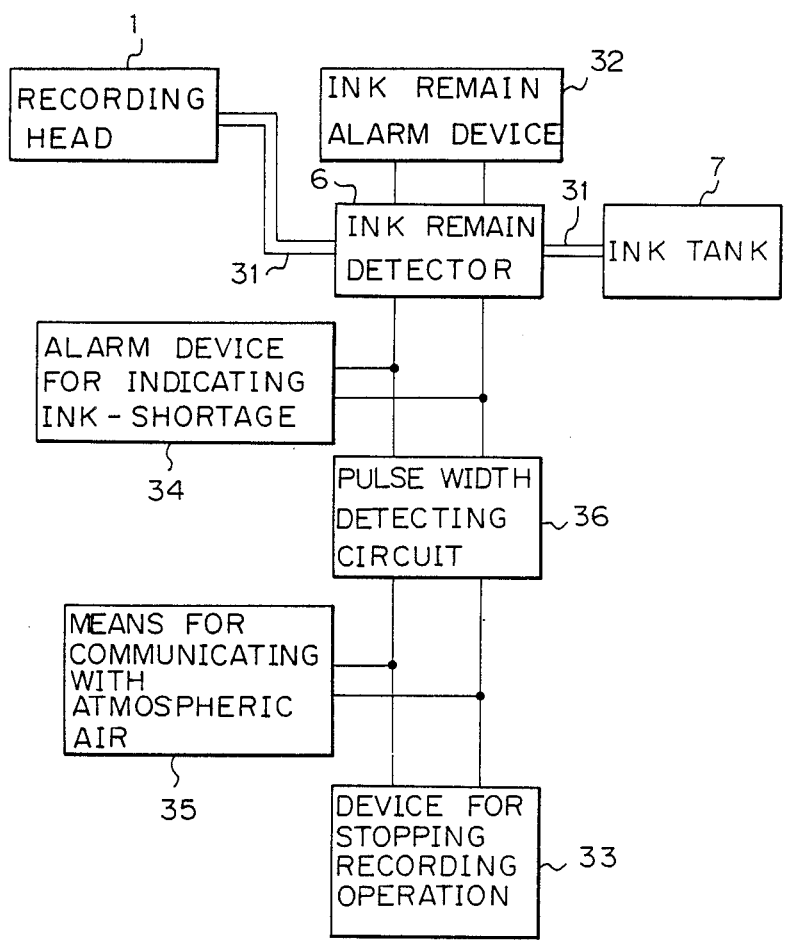
FIG. 9 is a block diagram of a control system in a third embodiment of the present invention.

FIG. 9 shows an embodiment of such a recording apparatus.

The control system of FIG. 9 differs from the control system of FIG. 7 in that a pulse width detecting circuit 36 is added between the ink remain detector 6 and the device 33 for stopping the recording operation and the means 35 for communicating with atmospheric air.

The pulse width detecting circuit 36 outputs a drive (control signal to the device 33 for stopping the recording operation and the means 35 for communicating with atmospheric air) when a pulse having a pulse width greater than a pulse width arbitrarily set by the ink remain detector 6 is input thereto.

Thus, according to the embodiment of FIG. 9, there is provided a liquid injection recording apparatus which has the operational effect obtained by the embodiment of FIG. 7 and in addition, can accurately execute stable detection and information of the amount of remaining ink and the control drive necessary therefor even when momentary malfunctioning is caused in the ink remain detector 6.

In the embodiments 3 and 4 illustrated, the respective ink remain detector means are comprised of pairs of electrodes 18 and 19 and 42, 43, but alternatively, these detector means may be comprised of photoelectric type detector means comprising light-emitting means and light-receiving means. Also, in each embodiment illustrated, two ink remain detector means operated at different pressures are provided, but in carrying out the present invention, it is likewise possible to provide three or more ink remain detector means operated at different pressures, as required.

According to each of the above-described embodiments, two ink remain detector means operated at two negative pressures in conformity with the purposes thereof are provided and therefore, there has been provided a liquid injection recording apparatus in which effective and highly reliable detection of the amount of remaining ink can be accomplished.

Also, the recording operation is stopped when the amount of remaining ink for which normal printing is impossible has been reached and therefore, bad influence upon the recording head and the ink remain detector could be eliminated.

Further, an ink remain detector conforming to the purpose of the liquid injection recording apparatus is provided by simply adding detector means comprising electrodes or light-emitting means and light-receiving means to the conventional ink remain detector and therefore, bulkiness and greatly increased cost of the apparatus can be avoided.

Of course, the ink remain detector provided with ink remain detector means operated at two or more different negative pressures can be adapted to the ink remain detector of the form as shown in FIG. 1B.

As is apparent from the foregoing description, according to the present invention, there is provided a liquid injection recording apparatus provided with an ink remain detector which is simple in structure and capable of accomplishing highly reliable and moreover, effective and accurate detection and information of the amount of remaining ink.

As is apparent from the foregoing description, according to the present invention, there is provided a liquid injection recording apparatus which is provided with two or more ink remain detector means operated by a variation in pressure, whereby effective and highly reliable detection of the amount of remaining ink can be accomplished.

We claim:

1. A liquid injection recording apparatus comprising:
a recording head for injecting ink toward a recording medium to thereby effect recording;
an ink tank storing therein the ink to be supplied to said recording head;
supply path means for supplying ink between said ink tank and said recording head; and
an ink remain detector provided in said supply path and including an inflow port into which ink flows, an outflow port from which ink flows out, an ink chamber communicating with said inflow port and said outflow port, a flexible film member which comprises at least a portion of a wall forming said ink chamber, and a plurality of detector means each having an electrically conductive member provided on said film member and an electrode provided correspondingly to said electrically conductive member and being fixed to said detector.

2. A liquid injection recording apparatus according to claim 1, wherein said detector means include a moving member responsive to the displacement of said film member and at least one set of light-emitting and light-receiving means disposed at a position whereat an optical path is interrupted by the movement of said moving member.

3. A liquid injection recording apparatus according to claim 1, wherein said fixed electrode serves also as a stopper member for controlling the amount of displacement of said film member.

4. A liquid injection recording apparatus according to claim 1, further including an ink remain alarm device for indicating an amount of remaining ink on the basis of the result of the detection by said detector means.

5. A liquid injection recording apparatus according to claim 4, wherein said ink remain alarm device includes means for indicating that little ink remains in response to at least one of said detector means, and means for indicating ink-shortage in response to another of said detector means.

6. A liquid injection recording apparatus according to claim 5, wherein said means for indicating that little ink remains and said means for indicating ink-shortage are common means.

7. A liquid injection recording apparatus according to claim 4, wherein said ink remain alarm device includes at least one means selected from among light-emitting means, sound generating means and display means.

8. A liquid injection recording apparatus according to claim 4, further including means for stopping a recording operation on the basis of the result of the detection by said detector means.

9. A liquid injection recording apparatus according to claim 1, further including means for communicating interior of said ink chamber with the atmospheric air.

10. A liquid injection recording apparatus according to claim 1, further including a resilient member generating a biasing force to bias said flexible film member in a direction to increase the volume of said ink chamber.

11. A liquid injection recording apparatus according to claim 10, further including adjusting means for adjusting the biasing force.

12. A liquid injection recording apparatus according to claim 11, wherein said adjusting means comprises screw means.

13. A liquid injection recording apparatus according to claim 10, wherein said resilient member comprises spring means.

14. A liquid injection recording apparatus according to claim 1, further including a stopper member for controlling the amount of displacement of said flexible film member.

15. A liquid injection recording apparatus according to claim 1, further including a stopper member for controlling the amount of displacement of said flexible film member, said stopper member being formed in said ink chamber.

16. A liquid injection recording apparatus according to claim 1, wherein said electrode provided on said film member is common to said plurality of detector means.

17. A liquid injection recording apparatus according to claim 1, further including a stopper for limiting the amount of movement of said flexible film member.

18. A liquid injection recording apparatus according to claim 1, further including a stopper for limiting the amount of movement of said flexible film member and wherein the electrode of one of said detector means is provided on said stopper.

19. A liquid injection recording apparatus according to claim 1, further including a stopper for limiting the amount of movement of said flexible film member, said stopper being provided in said ink chamber.

20. A liquid injection recording apparatus according to claim 1, wherein said flexible film member is in a substantially undisplaced state when said electrically conductive member and said electrode of one of said detector means are in contact with each other.

21. A liquid injection recording apparatus according to claim 1, wherein the number of said detector means is two.

* * * * *

UNITED STATES PATENT AND TRADEMARK OFFICE
CERTIFICATE OF CORRECTION

PATENT NO. : 4,977,413
DATED : December 11, 1990
INVENTOR(S) : AKIHIRO YAMANAKA, ET AL.   Page 1 of 2

It is certified that error appears in the above-identified patent and that said Letters Patent is hereby corrected as shown below:

COLUMN 2

Line 48, "spring 16" should read --spring) 16--.
    Line 59, "negative," should read --negative--.

COLUMN 3

Line 27, "the, record," should read --the record--.

COLUMN 5

Line 67, "FIG. 2)," should read --FIG. 2,--.

COLUMN 6

Line 45, "ink remains, in little" should read
        --little ink remains, in--.
    Line 61, "as the ink-shortage it" should read
        --an ink-shortage. It--.
    Line 66, "FIg. 1A" should read --FIG. 1A--.

COLUMN 9

Line 9, "constituted" should read --constitute--.

COLUMN 10

Line 7, "1" should read --51--.
    Line 8, "2" should read --52--.

UNITED STATES PATENT AND TRADEMARK OFFICE
CERTIFICATE OF CORRECTION

PATENT NO.  : 4,977,413

DATED       : December 11, 1990

INVENTOR(S) : AKIHIRO YAMANAKA, ET AL.       Page 2 of 2

It is certified that error appears in the above-identified patent and that said Letters Patent is hereby corrected as shown below:

COLUMN 12

Line 51, "interior" should read --the interior--.
    Line 51, after "with", delete --the--.

Signed and Sealed this

Fourth Day of August, 1992

Attest:

DOUGLAS B. COMER

*Attesting Officer*      *Acting Commissioner of Patents and Trademarks*